(12) United States Patent
Shafer (10) Patent No.: US 11,905,789 B2
(45) Date of Patent: Feb. 20, 2024

(54) HELICAL COIL ANNULAR ACCESS PLUG AND ABANDONMENT

(71) Applicant: ConocoPhillips Company, Houston, TX (US)

(72) Inventor: Randall S. Shafer, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 17/829,847

(22) Filed: Jun. 1, 2022

(65) Prior Publication Data

US 2022/0290527 A1    Sep. 15, 2022

Related U.S. Application Data (60) Continuation of application No. 17/164,871, filed on Feb. 2, 2021, now Pat. No. 11,421,506, which is a continuation of application No. 16/784,082, filed on Feb. 6, 2020, now Pat. No. 11,274,518, which is a division of application No. 15/918,393, filed on Mar. 12, 2018, now Pat. No. 10,648,279.

(60) Provisional application No. 62/470,234, filed on Mar. 11, 2017.

(51) Int. Cl.
| | | |
|---|---|---|
| *E21B 33/134* | (2006.01) | |
| *E21B 33/12* | (2006.01) | |
| *E21B 29/02* | (2006.01) | |
| *E21B 29/00* | (2006.01) | |

(52) U.S. Cl.
CPC .......... *E21B 33/134* (2013.01); *E21B 29/002* (2013.01); *E21B 29/02* (2013.01); *E21B 33/12* (2013.01)

(58) Field of Classification Search
CPC ...... E21B 33/134; E21B 29/002; E21B 29/02; E21B 33/12

See application file for complete search history.

(56) References Cited

U.S. PATENT DOCUMENTS

| | | |
|---|---|---|
| 2,286,075 A | 6/1942 | Evans |
| 3,170,516 A | 2/1965 | Holland |
| 3,208,530 A | 9/1965 | Allen |
| 3,618,639 A | 11/1971 | Daley et al. |
| 4,607,694 A | 8/1986 | Sah |
| 5,833,001 A | 11/1998 | Song et al. |

(Continued)

FOREIGN PATENT DOCUMENTS

| | | |
|---|---|---|
| JP | 2010155085 A | 7/2010 |
| WO | 2004040710 A1 | 5/2004 |

(Continued)

OTHER PUBLICATIONS

Piercey, D. G.; Klapotke, T. M. "Nanoscale aluminum—metal oxide (thermite) reactions for applications in energetic materials." Central European Journal of Energetic Materials, (2010) 7(2), 115-129.

(Continued)

*Primary Examiner* — Crystal J. Lee
(74) *Attorney, Agent, or Firm* — Boulware & Valoir, PLLC (57) ABSTRACT

A method for creating access to annular spacing during P&A operations is described. Specifically, helical coils are cut into one or more casings before the plugging material is set. The plugging material is able to exit the helical coils, forming multiple, small rock-to-rock seals.

5 Claims, 7 Drawing Sheets

(56) References Cited

U.S. PATENT DOCUMENTS

| | | |
|---|---|---|
| 6,478,088 B1 | 11/2002 | Hansen et al. |
| 6,679,328 B2 | 1/2004 | Davis et al. |
| 6,802,375 B2 | 10/2004 | Bosma et al. |
| 7,152,657 B2 | 12/2006 | Bosma et al. |
| 7,290,609 B2 | 11/2007 | Wardlaw et al. |
| 7,449,664 B2 | 11/2008 | Spencer |
| 7,455,104 B2 | 11/2008 | Duhon et al. |
| 7,640,965 B2 | 1/2010 | Bosma et al. |
| 7,669,653 B2 | 3/2010 | Craster et al. |
| 8,505,427 B2 | 8/2013 | Wilson et al. |
| 8,528,630 B2 | 9/2013 | Tunget |
| 8,555,764 B2 | 10/2013 | Le et al. |
| 9,057,254 B2 | 6/2015 | Hull |
| 9,181,775 B2 | 11/2015 | Eden |
| 9,228,412 B2 | 1/2016 | Lowry et al. |
| 9,334,712 B2 | 5/2016 | Bakken |
| 9,381,386 B2 | 7/2016 | Pigeon |
| 9,394,757 B2 | 7/2016 | Lowry et al. |
| 9,683,420 B2 | 6/2017 | Skjold |
| 9,932,791 B2 | 4/2018 | Walton et al. |
| 10,072,915 B2 | 9/2018 | Medina et al. |
| 10,316,612 B2 | 6/2019 | Shafer |
| 10,526,866 B2 | 1/2020 | Ferg |
| 10,597,970 B2 | 3/2020 | Pipchuk et al. |
| 10,648,279 B2 | 5/2020 | Shafer et al. |
| 10,738,567 B2 | 8/2020 | Shafer |
| 10,760,374 B2 | 9/2020 | Hearn et al. |
| 10,871,050 B2 | 12/2020 | Hearn et al. |
| 11,377,925 B2 | 7/2022 | Mueller et al. |
| 2003/0132224 A1* | 7/2003 | Spencer ............... E21B 33/138 166/60 |
| 2006/0144591 A1 | 7/2006 | Gonzalez et al. |
| 2008/0047708 A1 | 2/2008 | Spencer |
| 2010/0155085 A1 | 6/2010 | Spencer |
| 2010/0268489 A1 | 10/2010 | Lie et al. |
| 2010/0294569 A1 | 11/2010 | Aldred et al. |
| 2011/0203795 A1 | 8/2011 | Murphy et al. |
| 2015/0211327 A1 | 7/2015 | Lowry et al. |
| 2015/0211328 A1 | 7/2015 | Lowry et al. |
| 2018/0094503 A1 | 4/2018 | Wardley et al. |

FOREIGN PATENT DOCUMENTS

| | | | |
|---|---|---|---|
| WO | 2011151271 A1 | 12/2011 | |
| WO | 2012001342 A2 | 1/2012 | |
| WO | 2013135583 A2 | 9/2013 | |
| WO | 2014096858 A2 | 6/2014 | |
| WO | 2014108431 A2 | 4/2015 | |
| WO | 2015116261 A1 | 8/2015 | |
| WO | 2016049424 A1 | 3/2016 | |
| WO | WO-2017030806 A1 * | 2/2017 | ........... E21B 29/005 |

OTHER PUBLICATIONS

Puszynski, J. A.; Bulian, C. J.; Swiatkiewicz, J. J. "Ignition characteristics of nanothermite systems." International Journal of Energetic Materials and Chemical Propulsion, vol. 7 (2008) Issue 1, p. 73-86.

Puszynski, J. A; Swiatkiewicz, J. J., Higa, K. "Processing of aluminum-based nanothermites in a circulating mixer." (2017) https://ndiastorage.blob.core.usgovcloudapi.net/ndia/2009/gunmissile/7784swiatkiewTuesday.pdf.

* cited by examiner

HELICAL COIL ANNULAR ACCESS PLUG AND ABANDONMENT

PRIOR RELATED APPLICATIONS

This application is a continuation application which claims priority of U.S. application Ser. No. 17/164,871, filed Feb. 2, 2021, which is a continuation of application Ser. No. 16/784,082, filed Feb. 6, 2020, now U.S. patent Ser. No. 11/274,518, which is a divisional of U.S. application Ser. No. 15/918,393, filed Mar. 12, 2018, now U.S. patent Ser. No. 10/648,279, which claims the benefit of U.S. Provisional Application No. 62/470,234, filed on Mar. 11, 2017 and each is incorporated by reference in its entirety herein for all purposes.

FEDERALLY SPONSORED RESEARCH STATEMENT

Not applicable.

REFERENCE TO MICROFICHE APPENDIX

Not applicable.

FIELD OF THE DISCLOSURE

The invention relates to methods, systems and devices for plug and abandonment operations to shut down a well or a portion thereof.

BACKGROUND OF THE DISCLOSURE

In oilfield jargon, "plug and abandon" or "P&A" refers to preparing a well to be closed permanently (or at least until prices or technology developments warrant reentry). The decision to plug and abandon a well or field is an economic decision. Once production value drops below operating expenses, it is time to consider abandonment, even if considerable reserves remain. Thus, well abandonment is an inevitable stage in the lifespan of a well.

The earliest oil wells were abandoned without any plugging, and the first plugging requirements were enacted by Pennsylvania in the 1890s. Many wells were abandoned with plugs consisting of brush, wood, paper sacks, linen or any other material that could be pushed into a well to form a basis for the dumping of one or two sacks of cement to "plug" the well.

Current plugging procedures are significantly more disciplined due to modern regulations. The P&A regulations vary among states and between countries, but all regulations prescribe the depth intervals that must be cemented, as well as the materials that are allowed in plugging practices. Most states require that cement plugs be placed and tested across any open hydrocarbon-bearing formations, across all casing shoes, across freshwater aquifers, and perhaps several other areas near the surface, including the top 20 to 50 feet [6 to 15 m] of the wellbore. Some countries also require that a "rock-to-rock" cement plug be set that is contact with wellbore outside the casing if the casing is not isolated with cement.

In recognition of its strength, low permeability and low cost, cement is typically used to create a seal between formations or to seal off the surface of the wellbore. Other materials that do not offer the same strength or durability as cement, including drilling mud, gel, and clay, are used to fill in the spaces between cement plugs. Additionally, many states allow the use of mechanical bridge plugs in lieu of a large cement plug since the bridge plug is extremely strong and nearly completely impermeable. However, mechanical plugs are susceptible to corrosion and elastomer failure, and therefore the regulations typically require the bridge plugs to be capped by a specified amount of cement.

One of the main problems in any cementing procedure is contamination of the cement, leading to early failure. Poor mud-removal in the area where the cement is to be set can give rise to channels through the plug caused by the drilling fluid. To avoid this, a spacer is often pumped before and after the cement slurry to wash the hole and to segregate the drilling fluid and the cement from each other. However, issues can still arise.

Because cement is susceptible to early failure if contaminated by drilling or other fluids, other materials have been investigated for use as plugging material. Resins offer superior adhesion, resistance to many caustic and corrosive chemicals, excellent mechanical properties such as low yield point and low viscosity in the unset state, and flexibility and toughness after setting. Resin sealing materials include ThermaSet® by Wellcem AS, CannSeal® by AGR, and the WellLock® resin system by Halliburton. M&D Industries also makes resin plugging materials, including LIQUID BRIDGE PLUG® with a range of hardeners and accelerators. The WellLock® resin, for example, uses cross-linking between an amine hardener and epoxides, resulting in a cured three-dimensional infinite polymer network, and can be deployed without negative impact from exothermic reactions triggered by water.

New types of cement slurries consisting of geopolymeric materials have also been developed as alternative to the conventional lightweight cement slurry. Geopolymers are made of aluminum and silicon and they exhibit superior mechanical and chemical properties compared to the Class G cement. Geopolymers can provide a material with specific properties from a range of cement/flyash/aluminiosilicate component ratios. This gives a light-weight slurry with high compressive and flexural strength thought to replace the conventional lightweight cements containing silica fume.

Sandaband is another cement alternative. It is a sand-slurry consisting of about three quarters sand particles and one quarter water and other additives, developed in Norway to meet the increasing demands of an everlasting plugging material. Sandaband possesses the properties as a Bingham fluid and acts as a deformable solid when it's stationary, but as a liquid when in motion. This ductile behavior means that the sand slurry will never fracture or create micro annuli. The sand slurry is also incompressible and gas tight, and does not shrink, fracture or segregate. It does however require a solid foundation, as it will sink if placed on another fluid.

As noted above, many regulations now also required that the plug be set across the entire borehole. As most wells have at least one casing string or liner, access to the annular space to set the plug is problematic.

Figure 1:
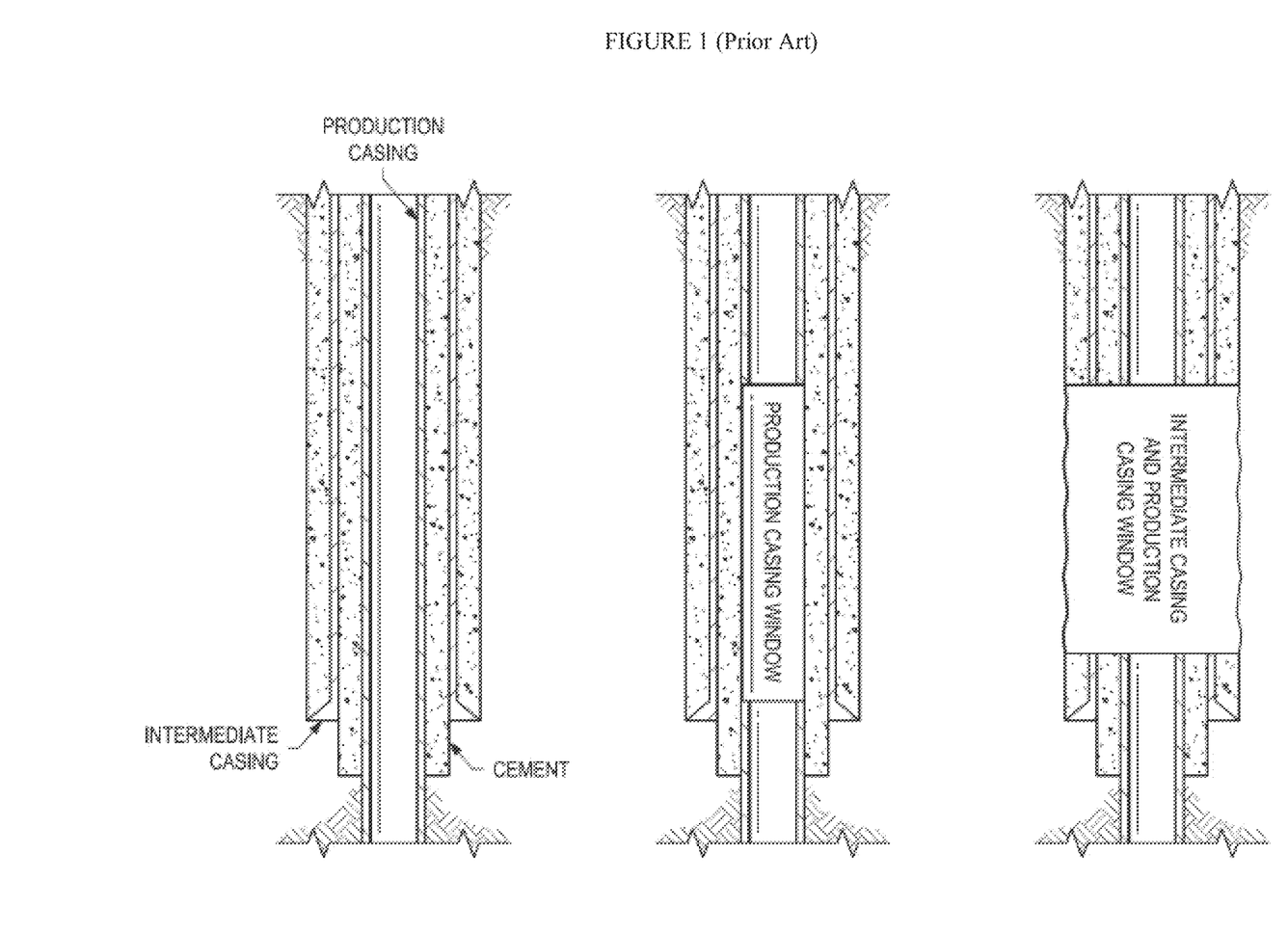

Currently, operators have to remove sections of casing so that a plug may be set that is continuous across the entire borehole in a configuration often referred to as "rock-to-rock," and located in the cap rock above the reservoir. Because cement or other plugging material must go all the way to the formation wall, the typical procedure was to pull the tubing, mill the casing, and remove swarf before spotting the cement (FIG. 1). However, this process may require multiple trips downhole and the tons of swarf that must be removed can accumulate in low flow zones, and has razor sharp edges, being hazardous to both drill crew and equipment. Plus, the method is expensive and time-consuming, and it has not been successfully applied to reservoirs with more than two strings.

One response to these challenges has been the introduction of a system known as perforate, wash and cement (PWC) in a single run. The PWC operation is designed to access the formation through perforations in the casing to place a rock-to-rock cement barrier without removing the casing, thus saving valuable rig time. To use this system, the well must be secured, Christmas tree removed, tubing pulled, and then PWC job can be done.

The PWC method uses a special tool by Archer, described in US20150053405. The tool is made of pipe conveyed perforating guns attached below a wash tool, which is below a cement stinger. Using PWC, ConocoPhillips completed 20 PWC plug installations in the North Sea, reducing the time required to set a permanent plug to 2.6 days from 10.5 days using section milling. As a result, the company calculated a savings of 124 rig days over the course of the 20 PWC wells. Given that rig time can easily be upwards of half a million dollars per day for an offshore rig, even a few days less time required for P&A can mean significant cost savings.

Although an improvement, the PWC method has limitations. To date, the PWC method has not been successfully applied through multiple casings. Furthermore, it is difficult to implement this method if the pipe has deformed such that the lengthy tool can no longer pass through the deviated section. Another disadvantage of both the milling and PWC methods is that the well must be secure and the tubing has to be pulled to implement these methods, which raises costs.

Thus, what is needed in the art are better methods, devices and systems for P&A that are safe, create a reliable barrier, that are cost effective, and both faster and easier to perform than current methods. Ideally, the new method would be performed through tubing, and could provide access to the annular space to allow for a "rock-to-rock" plug. An ideal system would also be applicable to wellbores with two or more casings or strings.

SUMMARY OF THE DISCLOSURE

The present disclosure provides a novel method for P&A operations.

Specifically, laser technology or an abrasive cutter is used to cut helical coils in one or more tubulars to allow annular access to set a P&A plug. This helical coil pattern removes less metal from the wellbore, but gives complete 360° annular access to allow for placement of a "rock-to-rock" plug. The remaining steps in the P&A operations can be performed as normal.

The method is a "through tubing" P&A because the tubing is left in place for the operation. The cutter is able to cut through the tubing, in addition to multiple casing strings. The cut tubing can then fall to the bottom of the well. However, other methods can be used to remove the tubing, including upward milling using coil tubing.

Once the tubing is removed, the cutter can cut the helical coils into the casings. The helical coils allow complete access to the annular space but reduce the amount of metal that is removed. This, in turn, reduces the amount of time and cost typically needed to carefully remove the metal. Further, by virtue of the helical shape and reduced metal removal, the casing remains intact after the cutting. Other configurations such as circular cuts would result in the casing collapsing and falling downhole.

Once the strings are cut, plug and abandonment operations can proceed. A base plug comprising cement or eutectic alloys or bismuth-based alloys can be introduced into the well, or a resin can be used. The plug material can be added to the top of the base plug. This material can be any currently used material such as resins, cement, alloys or combinations thereof. Further, the plug material will be able to exit the helical openings to form a rock-to-rock plug. The plugs can also be drilled through for evaluation without affecting the material in the helical openings.

The benefits of using this technique to open up the annular space, over those known in the art, are that all defects will be intersected by the helical coils and less plugging material will be required because less annular volume is open. Unlike the more common milling or PWC methods, no vertical flow paths will be created and the coil cutting will not be able to create a vertical leak path external to the casing. Both milling and PWC creates such paths. Further, this method is not limited by depth back from the casing.

Another benefit of the helical coil cutting is the creation of multiple openings in the rock. When plugging material is added to the wellbore, it can escape the helical openings to form the rock-to-rock seals at different depths. Thus, rotations in the coil allows for multiple "o" ring type seals in the annulus. Further, failure at one of these seals does not mean that the next "o" seal will fail.

Any tool that is capable of cutting through tubing and multiple casings can be used. Applicant has found that laser technology offers the best ability to cut through many layers and to form the tight helical coils needed to reduce metal debris and not create new vertical flow paths, although abrasive cutters can also be used.

Any type of plugging material can be used in the present method. Many of the commonly used cements and resins are described above. But, eutectic metal alloys can also be used. For instance, a low melt alloy can set a cast-in-place abandonment plug, that can then be combined with additional cement or resin or geopolymer plug, according to regulations and well dictates. Low melt alloys or fusible alloys are alloys with a low melt temperature and that can expand up to 3.32% when solidifying from a liquid to a solid depending on the product. This expansion allows these alloys to precisely conform to any intricate details when molded. In a cast-in-place abandonment plug, the expansion means that the plug will expand to firmly contact the reservoir walls, as well as any metal casing or tubing, and provide a tight seal.

Bismuth alloys are a preferred cast-in-place abandonment plug material because bismuth expands 1-3.32% on solidification. Bismuth also has unusually low toxicity for a heavy metal. Furthermore, we have tested these alloys and know that the liquid alloy does not mix with other fluids, like cement does. Thus, the channeling common in cement plugs is avoided.

The ability to drop solid pellets to the plug location also allows for easy placement of the alloy. Further, the liquid form of the alloy has a viscosity like water, thus easily penetrating and conforming to any irregularities downhole. Finally, because of the expansion on solidification, the alloy penetrates more than cement and bonds more tightly as well, yet the final plug is still ductile. The high quality of the material and its bond allows a shorter length to be plugged, thus even if cutting or milling are performed, the interval is much shorter than typical, greatly saving on time and cost.

A low-melting point bismuth-containing alloy such as "Rose's metal", "Kraft's alloy" or "Homberg's alloy", or any other suitable bismuth alloy is used. Such alloys are unusual in that they have a higher density in liquid form than in their solid state and therefore expand upon solidification.

Once deposited in a well they lose heat into the surrounding environment, solidify, and expand to form a very secure plug within the well. Furthermore, there are commercially available tools and prototype tools are being developed that can heat bismuth alloy pellets downhole, thus allowing the use of these materials as cast-in-place abandonment plugs, but with no nonmetal components that could deteriorate.

Bismuth alloys have been used downhole before. For example, US20130333890 describes the use of bismuth alloys as bridge plugs, thus allowing them to be melted when it is desired to remove the plug. However, the patent does not describe any P&A uses of the alloy, and the plug is not cast-in-place. Furthermore, the bridge plugs are typically of shorter length than the abandonment plugs that will be needed in the P&A operations.

US20100006289 describes plugging a well with a bismuth cast-in-place alloy. However, that patent describes the use of such cast-in-place plugs within the casings, and does not provide for rock-to-rock plugging methods, as described herein. Furthermore, the alloy is melted before deployment, as opposed to being melted in-hole. The present methods would require melting after deployment such that the metal is capable of exiting the helical openings in the casing.

U.S. Ser. No. 62/402,796, filed Sep. 20, 2016, and incorporated herein in its entirety for all purposes, also describes bismuth alloy abandonment plugs and methods of setting them. In some embodiments, the bismuth alloys are preferred due to their low melt temperatures, ease of use and robustness.

Further, combinations of the alloys, cements, and resins can be used to form a two-material plug. Preferably, at least one of the materials is alloy or resin.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, a "P&A" refers to plug and abandon. Regulations require that the plugs be of sufficient quality to be "permanent," never allowing formation fluids to leak. However, it is recognized that even a permanently plugged and abandoned well may be reopened at a later time for various reasons. Therefore, "permanent" does not imply that the well will not be reopened, but instead refers to the quality of the plug—it needing the potential to last permanently. That said, most plugs probably won't last forever, and some degree of flexibility in meaning can be accommodated by these terms of art.

"Tubular" or "tubing" can be used generically to refer any type of oilfield pipe, such as drill pipe, drill collars, pup joints, casing, production tubing and pipeline. However, generally we have referred to the inner tubing, such as injection tubing or production tubing as tubulars herein. The outer one or more tubing sets, we have referred to as "casing" herein.

As used herein, a "cutter" is any downhole tube that can be used to cut casing or tubing, which is typically done when a tool is stuck, in order to retrieve the tubing string and send down fishing tools. There are a number of different types of such tools, some of which are named herein.

As used herein, an "abrasive" or "jet" cutter is a type of cutter, generally run on wireline or coiled tubing, that uses a stream of fluid to cut the surrounding tubing or casing wall.

As used herein, "casing string" and "string" are used interchangeably to refer to a long section of connected oilfield pipe that is lowered into a wellbore and cemented. Often, multiple strings of concentric casings are used in a wellbore.

As used herein a "cement bond log" or "CBL" is a representation of the integrity of the cement job, especially whether the cement (or resin or metal) is adhering solidly to the outside of the casing. The log is typically obtained from one of a variety of sonic-type tools. The newer versions, called cement evaluation logs, along with their processing software, can give detailed, 360-degree representations of the integrity of the cement job, whereas older versions may display a single line representing the integrated integrity around the casing. In this case, the CBL is used to determine that a good connection between the abandonment plug and the formation walls.

A CBL can be generated with a "cement bond tool." Cement bond tools measure the bond between casing and the cement placed in the annulus between the casing and the wellbore. The measurement is made using acoustic (sonic and ultrasonic) tools.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| P&A | Plug and abandonment |
| PWC | Perforation/wash/cement |
| CBL | Cement bond log |

BRIEF DESCRIPTION OF THE DRAWINGS

FIG. 1 (Prior art) provides a simple schematic of milled windows. Casing strings of lower completions that are poorly cemented but cemented in a manner that renders them irretrievable (left panel) must be milled. One trip is required to mill the production casing (middle panel) and then separate trips are required for any intermediate casings (right panel) until all annuli and the formation are exposed. The milling debris (swarf) is removed, the hole cleaned, and then cement is run (not shown). This method allows the operator to cement each annulus according to permanent P&A requirements before e.g., drilling a sidetrack.

DESCRIPTION OF EMBODIMENTS OF THE DISCLOSURE

The invention provides novel methods of accessing the annular space in a wellbore before plug and abandonment operations. Basically, a laser or abrasive cutters are used to cut a helical coil out of the casing in the wellbore. Any cement or metal encountered during the cutting will fracture or splay due to moisture expansion and the resulting debris will fall to the bottom of the well along with the cut tubing. This opens up 360-degree access to the annular space such that all defect paths can be intersected and plugged.

The present methods include any of the following embodiments in any combination(s) of one or more thereof:

A method of plugging a hydrocarbon well, comprising:
a) deploying a cutting tool downhole to cut helical coils out of one or more casings at said section of well to be plugged, wherein said helical coil openings provide access to the annular space external to the outermost casing, wherein the resulting helical casing cuttings fall to the bottom of the well;
b) deploying a base plug below and adjacent to said section of well to be plugged;
c) deploying a plugging material into said section of well to be plugged, wherein said plugging material rests above said base plug and is able to squeezed out of said helical coil openings while filling said section of well to be plugged; and,
d) allowing said plugging material to set, wherein set plug forms a series of rock-to-rock seals through the helical coil opening.

Any method herein described, wherein said cutting tool is a laser or abrasive cutter.

Any method herein described, wherein said plugging material is cement, resin, or a low-melt alloy.

Any method herein described, wherein said plugging material contains at least two of cement, resin, or a low-melt alloy.

Any method herein described, wherein said low-melt alloy contains bismuth.

Any method herein described, wherein an inner tubing string was removed at said section of well to be plugged using said cutting tool before said casing string was cut.

A through-tube method of plugging a hydrocarbon well, comprising:
a) deploying a first tool downhole to remove or to create an opening in an inner tubing string at a section of well to be plugged;
b) deploying a cutting tool downhole to cut helical coils in one or more casings at said section of well to be plugged, wherein said helical coils openings provide access to the annular space external to the outer most casing, further wherein the resulting helical casing cuttings fall to the bottom of the well;
c) deploying a base plug below and adjacent to said section of well to be plugged;
d) deploying a plugging material into said section of well to be plugged, wherein said plugging material rests above said base plug and is able to squeezed out of said helical coil openings while filling said section of well to be plugged; and,
e) allowing said plugging material to set, wherein set plug forms a series of rock-to-rock seals through the coil open.

Any method herein described, wherein said first tool is a laser that creates an opening in the inner tubing string by cutting a helical coil into the inner tubing string, or wherein said first tool mills the inner tubing string to remove it.

A through-tube method of plugging a hydrocarbon well, comprising:
a) deploying a cutting tool containing a laser downhole to create an opening and remove an inner tubing string at a section of well to be plugged;
b) cutting helical coil openings in one or more casings at said section of well to be plugged using said laser, wherein resulting helical casing cuttings fall to the bottom of the well;
c) deploying a base plug below and adjacent to said section of well to be plugged;
d) deploying a plugging material into said section of well to be plugged, wherein said plugging material rests above said base plug and is able to squeezed out of said helical coil openings while filling said section of well to be plugged; and,
e) allowing said plugging material to set, wherein set plug forms a series of rock-to-rock seals through the coil open.

An improved method of plugging a well, wherein said method comprising removing tubing and casing, setting a base plug and a plug, said improvement comprises cutting a helical coil through said casing to make a resulting opening instead of removing the casing so that said plugging material can pass through said resulting opening to form a rock-to-rock seal above said base plug.

Any method herein described, wherein said cutting tool is a laser or abrasive cutter.

The present invention is exemplified with respect to the following description regarding laser cutters. However, this is exemplary only, and the invention can be broadly applied to any type of abrasive cutters and tubulars. The following examples are intended to be illustrative only, and not unduly limit the scope of the appended claims.

Access to the annular space is important during plugging operations to fully block all flow paths. One currently used method for accessing this space involves section milling where lengths of 30-100 meters of casing are removed. Such methods are costly due to the time needed to remove the casing and the extra care needed to remove the metal from the casings. For instance, in a typical milling operation, the inner string is removed by milling followed by removal of the next section, leading to a large volume of material that has to be removed from the well.

In addition to being slow, milling suffers from high-level operational issues and failures. Further, such milling creates vertical flow paths for flow from below that must also be sealed during P&A.

A second common method is a perforation/wash/cement (PWC) technique, which perforates the casing, washes the area behind the casing and then cements the space behind the casing. As with the technique above, vertical flow paths for flow from below are created and must also be sealed during P&A. Further, to improve efficiency, larger perforation are needed. However, such perforations complicate the evaluation using cement bonds log.

Neither of these common methods for opening up the annular space has been successfully applied to wellbores with multiple casing strings. However, both methods create new vertical flow paths and generate a large amount of waste material that must be dealt with and/or removed.

The presently described method was developed to not only allow for rock-to-rock plugs to be set by opening the annular space but to be used with multiple casings and with through tubing settings. Further, the method does not generate new flow paths. Instead, it allows for the creation of multiple "o" ring like rock-to-rock seals.

Figure 2:
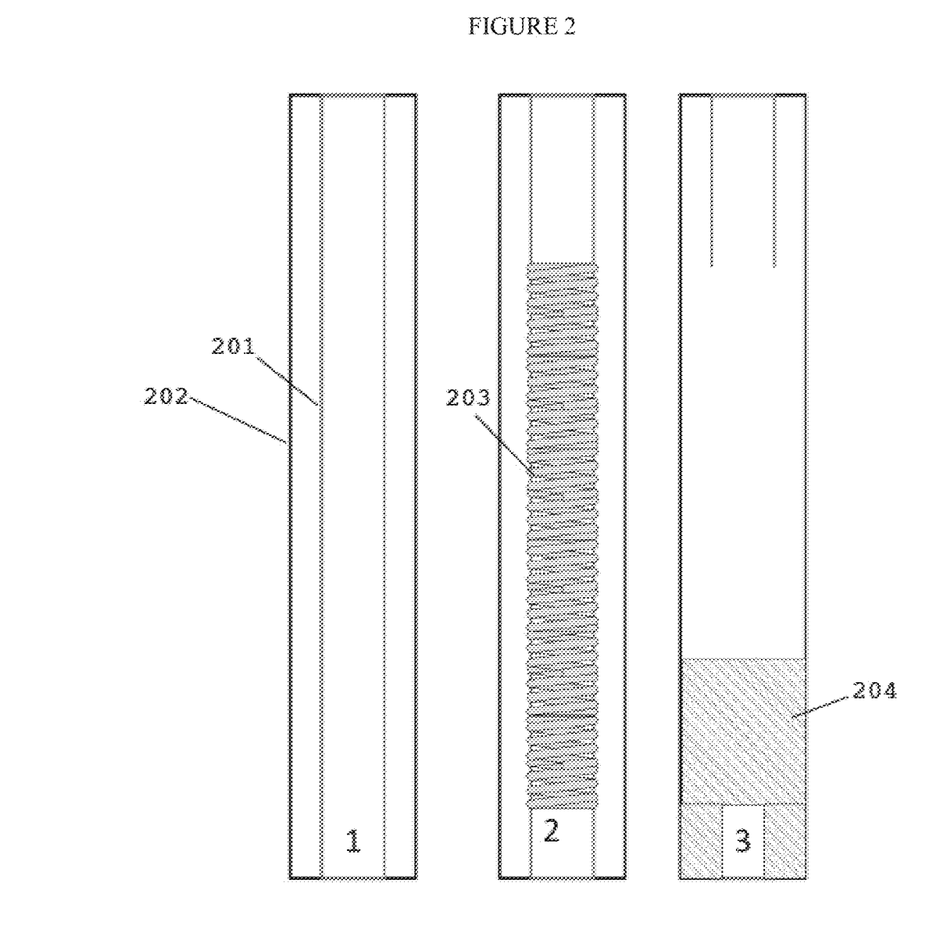
FIG. 2 An initial wellbore with a casing string and tubing before and after the tubing is removed.

A wellbore in its initial state (1), complete with tubing (201) and casing (202) is shown in FIG. 2. A cutting tool, typically a laser (left) or abrasive cutter (right), is used to cut tight helical coils (203) through the tubing (201), at a predetermined depth and for a predetermined length, to allow access to the casing (202). The debris from both the cuttings and from the collapse of the cut tubing will fall to the bottom of the well (204).

Though a cutting tool is shown in FIG. 2 to remove the tubing using helical coils, other methods can be used for this step, including upward milling using coil tubing.

Once the tubing is removed, the cutting tool can then be used to cut helical coils in the casing(s). The cutting tool should be able to cut through multiple casings in a single run. Lasers are the preferred means for cutting the coils because they are robust, capable of making tight or loose coils, and can cut through many layers of metal. However, abrasive cutters can also be used.

Figure 3:
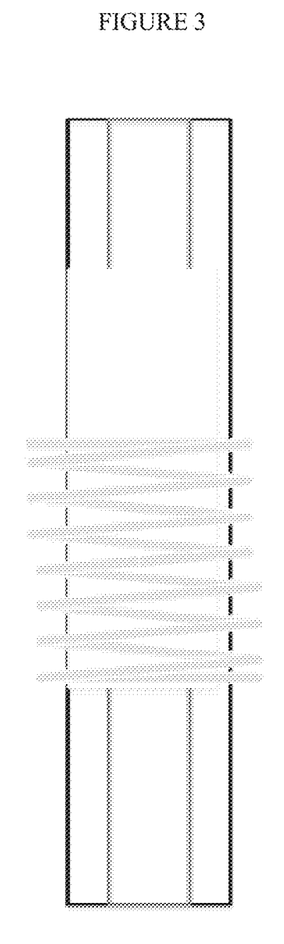
FIG. 3 Displays a wellbore after helical coils have been cut into the casing.

FIG. 3 shows a wellbore with helical coil cuttings in one casing. This is exemplary only and FIG. 5 displays coil cut into three casing strings with a laser (left) and an abrasive cutter (right). Note, the casing remains intact after being cut by the cutting tool. The cuttings, however, are capable of falling down the well, much like the tubing debris.

Figure 4:
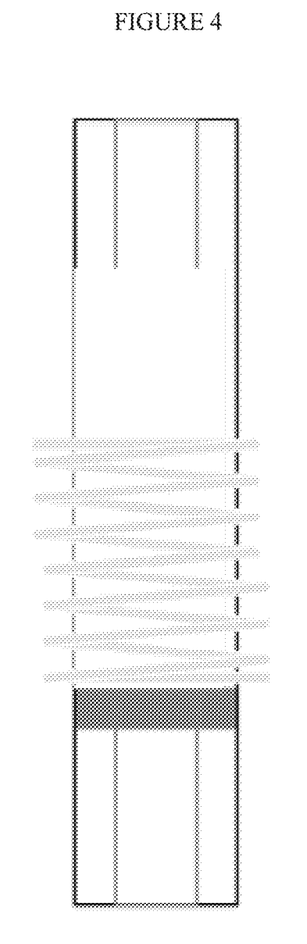
FIG. 4 Displays the wellbore in FIG. 3 with a base plug.
Figure 5:
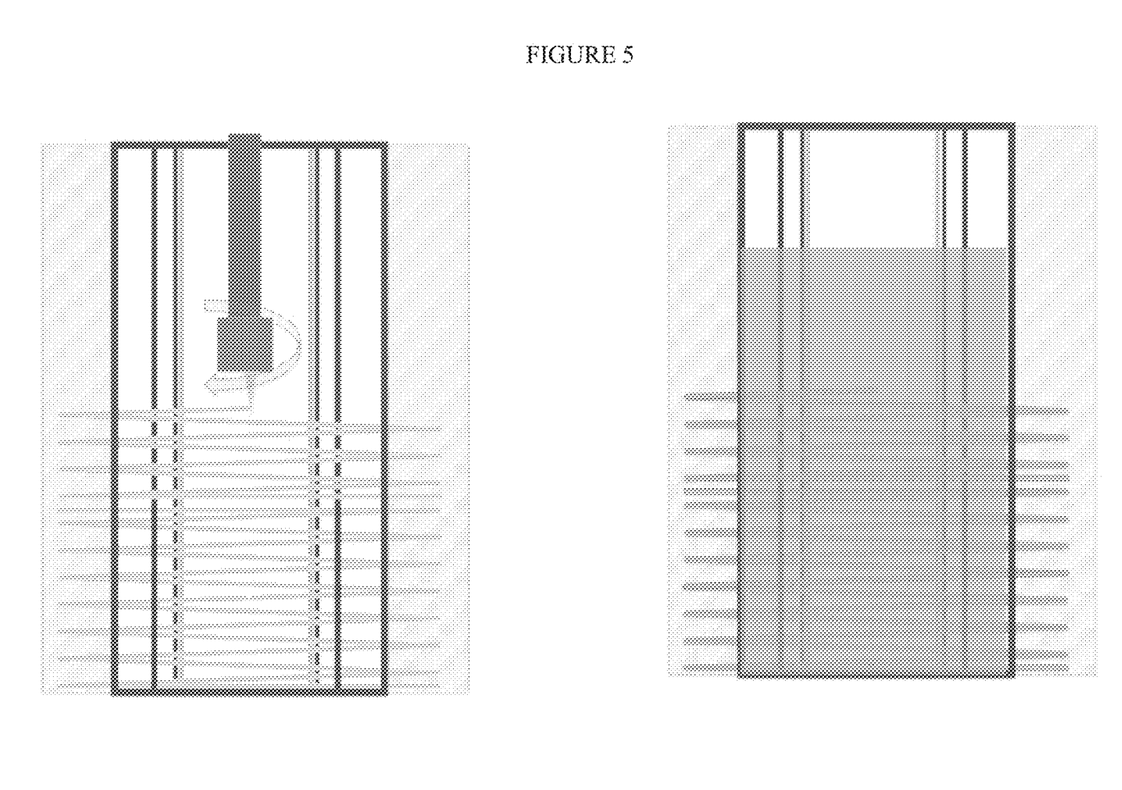
FIG. 5 Displays wellbores with multiple casings after the helical coil is cut using a laser (left) or an abrasive cutter (right).

As shown in FIGS. 3-5, the helical coil cuttings allow access to the annular space outside the casings. The coils are exaggerated to show that they will touch the rock outside the casings.

Once the annular space is open, plugging operations can begin. The first step is the placement of a base plug to seal the casing, as shown in FIG. 4. The base plug can be made of any material normally used, such as cement, resins or bismuth alloys.

Alternatively, thermite material can be placed in the casing and reacted to melt the debris from the tubing and casing cuttings. In this embodiment, a heat resistant base plate composed of ceramic material can be placed in the wellbore before the tubing or casing coils are removed to collect them for melting, but also to protect any material below the plug location from the thermite reaction. Even if the heat resistant base plate does not provide a perfect seal, the use of low melt bismuth alloys in the thermite will quickly seal that base plug as the molten alloy front penetrates any gaps, and then cools and hardens. Any imperfections will thus quickly be sealed.

Figure 6:
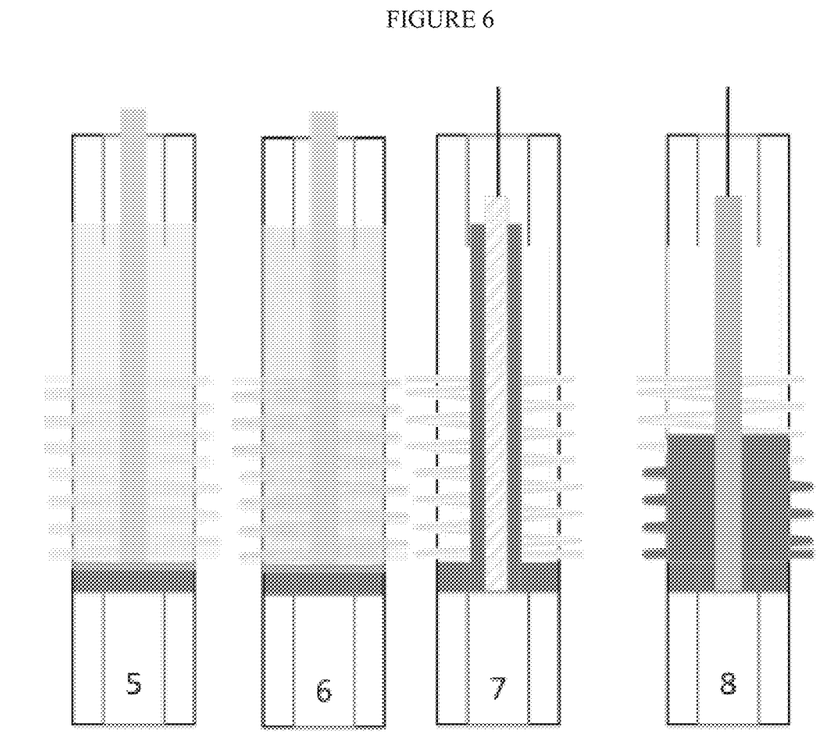
FIG. 6 Displays the wellbore in FIG. 4 with the addition of cement, resin or an alloy. In the case of the alloy, a heater has to be run downhole to heat and melt the alloy.
Figure 7:
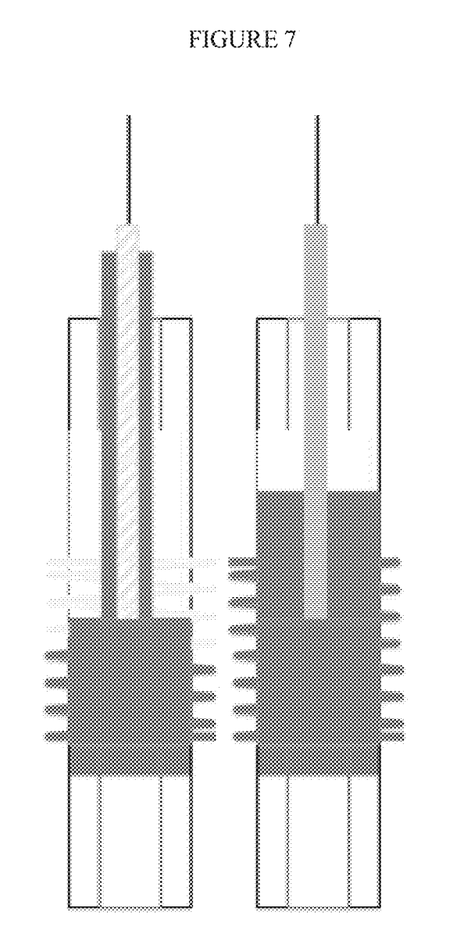
FIG. 7 Shows the additional steps of adding more alloy material to ensure that the helical coil openings are sealed.

Once the base plug is set, the plug material can be introduced. FIG. 6 shows how resin can be placed with coil tubing (5), cement can be placed with coil tubing (6), or how a low melt alloy being placed using a wireline tool (7) and a heater being run into the well to melt the alloy (8). FIG. 7 shows additionally alloy being added to the plug and heated in order to form a plug longer than the helical cutting.

Regardless of the material being used, the material will flow out of the casing through the helical openings, creating multiple small, rock-to-rock seals. Larger plug seal failures propagate through the entire plug, thus rendering it useless. Here, the benefit of these many small seals is that one or more of the seals can fail without affecting the others.

Figure 8:
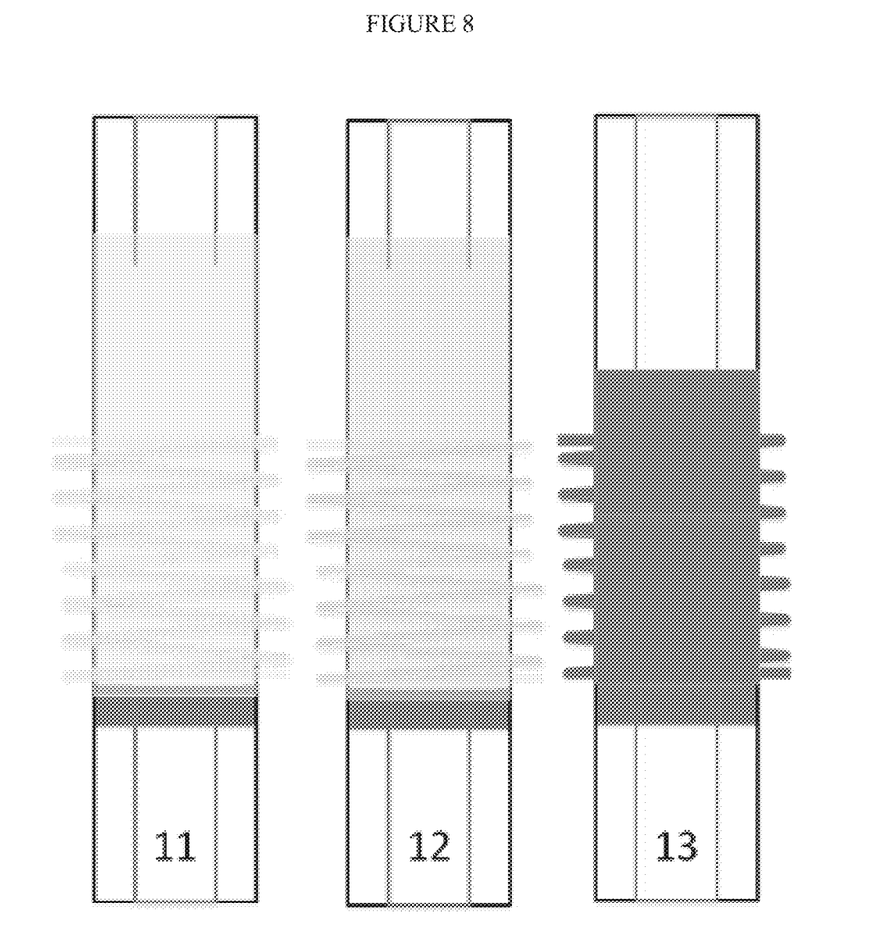
FIG. 8 Shows the wellbore sealed with cement, resin or alloy plugs, including the multiple rock-to-rock seals formed from plugging material exiting the coil openings.

FIG. 8 displays plugs for resin (11), cement (12) and alloy (13). Though shown as single-material plugs, the plugs can also be created using two or more materials. Ideally at least one of the materials is resin or alloy.

After the plugs are set, they can undergo normal evaluation, including being drilled through for logging or cement bond logging. Also, because the helical cuttings do not affect the type of plugging material used, any known additives can be added to aid in logging and evaluation. For instance, if resin is used as the plugging material, it can be doped with a low activity tracer that can be used for logging techniques.

Though the methods have been exemplified using single casing wellbores and only cement, resin or alloy plugging materials, the invention can be broadly applied to wellbores with multiple casing strings and any plugging material.

The advantages of the described helical cutting technique to open access to the wellbore allow for rock-to-rock plugs to be formed are:

All defects paths will be intersected and the cuttings cover 360 degrees in each complete coil.

Flow paths vertically are not created. Generally, there exists some isolation vertically in the annulus, however, the "coil" does not create a vertical leak path externally, unlike milling and PWC.

The cuttings create multiple "O" ring type seals in the annulus. Both resin and alloys, particularly bismuth-based alloys, ideal material to form these seals. Cement can also be used.

Creates multiple annular seals so that failure of one seal does not mean next seal will fail.

Can create seal back into the formation depending on depth of cut into the rock wall. Both milling sections and PWC have limited depth back from casing.

Material requirements for forming the plug are less as annular volume is reduced because of the amount of casing still left after the helical cuttings.

Multiple string wells can have access to the annular space.

The process utilizes through tubing P&A, which reduces the cost compared to rig-based P&A.

Tubulars remain in place and will not fall. If circular cuts were formed in the tubulars, they would likely fall into the wellbore.

The helical coil design reduces the amount of metal that has to be removed by the cutting tool and is less metal than that removed by section milling. Reduced metal removal facilitations better evaluations using current bond log (CBL) technology.

Limits operating time with a laser because failures are reduced and less fluids are introduced into the system.

The following references are incorporated by reference in their entirety for all purposes:

U.S. Ser. No. 62/402,796, filed Sep. 20, 2016.

U.S. Ser. No. 10/648,279, U.S. Ser. No. 11/274,518, US20210156222 Helical coil annular access plug and abandonment.

US20100006289 Method and apparatus for sealing abandoned oil and gas wells.

US20130333890 Methods of removing a wellbore isolation device using a eutectic composition.

US20130087335 Method and apparatus for use in well abandonment.

US20150345248, US20150368542, US20160145962, Apparatus for use in well abandonment.

US20150368542 Heat sources and alloys for us in downhole applications.

U.S. Pat. No. 6,474,414 Plug for tubulars

U.S. Pat. No. 6,664,522 Method and apparatus for sealing multiple casings for oil and gas wells.

U.S. Pat. No. 6,828,531 Oil and gas well alloy squeezing method and apparatus.

U.S. Pat. No. 6,923,263 Well sealing method and apparatus.

The invention claimed is:

1. A method of sealing an open annular space in a hydrocarbon well, said method comprising:
    a) deploying a cutting tool downhole to cut a helical coil opening in one or more casings at a section of an open annular space in a well to be sealed, wherein said helical coil opening provides access to said open annular space external to an outermost casing;
    b) optionally deploying a base plug below said section;
    c) deploying solid bismuth alloy to said section;
    d) deploying a heater to said section to melt said solid bismuth alloy to form molten alloy;
    e) allowing said molten alloy to flow out said helical coil openings and allowing said molten alloy to solidify, thereby plugging said section with a plug; and
    f) drilling through said plug leaving a sealed annulus.

2. The method of claim 1, further comprising squeezing said molten alloy to force it to flow out said helical coil openings while filling said annular space.

3. The method of claim 1, further comprising repeating steps a)-d) at one or more different depths.

4. The method of claim 1, wherein said cutting tool is a laser or an abrasive cutter.

5. The method of claim 1, wherein said base plug is deployed below said section, said base plug comprising cement, resin or bismuth alloy.

* * * * *